Sept. 24, 1935.   R. SADWITH   2,015,195
AIR INSULATED HEATER
Filed Oct. 5, 1931   3 Sheets-Sheet 1

INVENTOR
Ryan Sadwith
BY C. Campbell Humrike
ATTORNEY

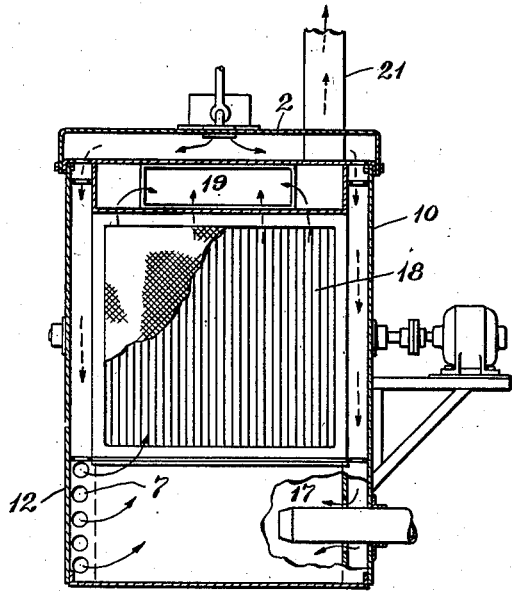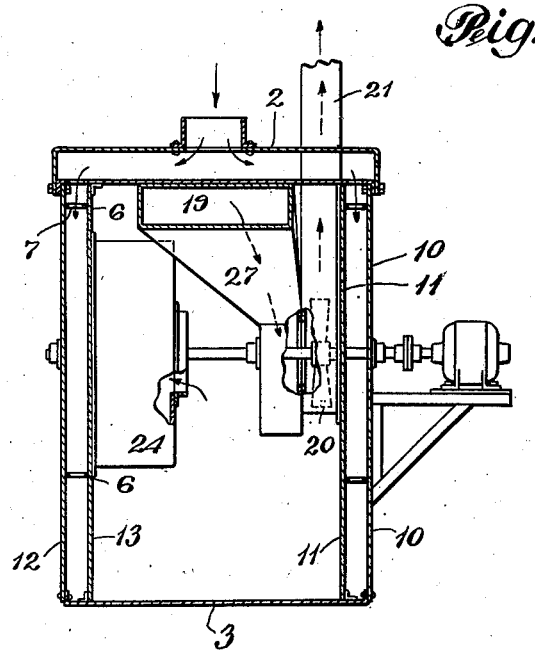

Sept. 24, 1935. R. SADWITH 2,015,195
AIR INSULATED HEATER
Filed Oct. 5, 1931 3 Sheets-Sheet 3
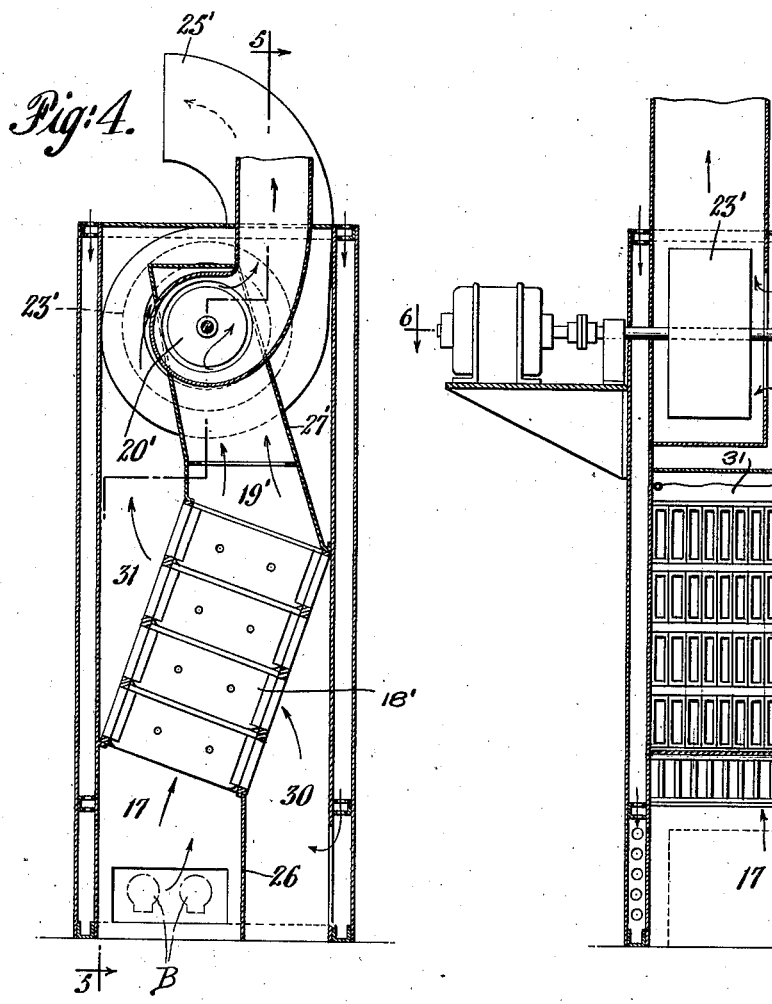
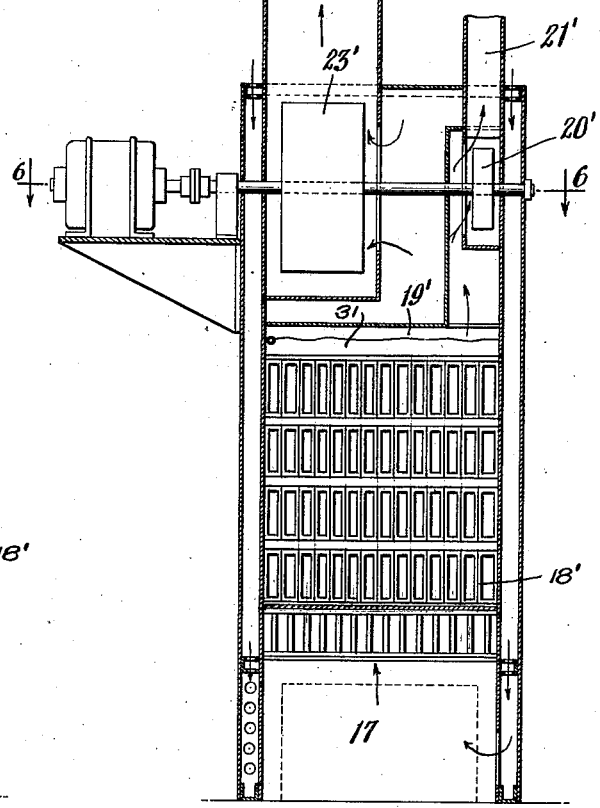
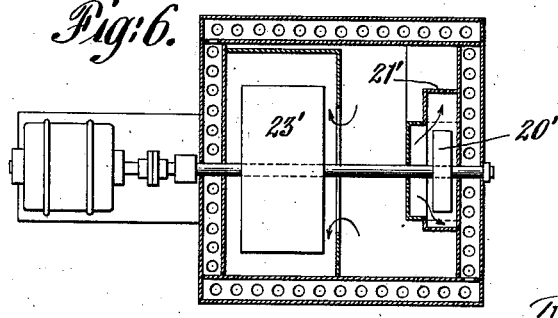
INVENTOR
Ryan Sadwith
BY C. Campbell Hunicke
ATTORNEY Patented Sept. 24, 1935

2,015,195

UNITED STATES PATENT OFFICE 2,015,195

AIR INSULATED HEATER

Ryan Sadwith, Newark, N. J.

Application October 5, 1931, Serial No. 567,002

1 Claim. (Cl. 126—110)

This invention relates to a unit gas or oil heater.

Heaters independent of a central source of heat supply are frequently desirable. In general, these heaters utilize gas or oil as a fuel for heating or drying purposes and the products of combustion may or may not be intermingled with the heated air delivered by the heater.

Such heaters are particularly desirable in factories if they are easily installed and readily removed as a unit. Under certain conditions, it is desirable to suspend them out of the way and above the floor. This can only be done where the heater is of light construction. I have found that a unit heater may be constructed of light construction and of unit structure whereby such heater may be easily moved about a factory or other building or may even be suspended in the air. This result is accomplished by the elimination of the combustion chamber linings of fire brick or tile and the special construction of the walls out of light metal of two thicknesses in spaced relationship with strengthening supports between the walls. The walls are cooled by down drafts of admitted air which absorb the heat from the inner wall thereby dispensing with the fire brick and tiling of the combustion chamber and the combustion air is preheated as a portion of the air drawn through the walls is utilized for the combustion air, and likewise the balance of the air drawn down through the walls is utilized for the drying or heating air where the drying or heating air is not commingled with the products of combustion. In the case of commingling the products of combustion and the heating medium, all the air drawn through the walls is utilized for combustion purposes.

One of the objects of this invention is to provide a heater utilizing gas or oil as fuel which is self contained. Another object of the invention is to provide a compact heater of efficient operation and low cost of construction wherein expensive refractories and wall heat insulating material are dispensed with.

A still further object of the invention is to provide a unit heater of sturdy construction but light enough to be suspended from ceiling or roof beams or capable of being positioned at any place desired.

Another object of the invention is to increase the efficiency of a unit heater by preheating the secondary combustion air and the drying or heating air utilizing the heat of the walls of the heater as a source of supply for the heating medium while at the same time cooling the walls.

A further object of the invention is to provide a unit heater where the heat may be controlled within definite limits and which can be utilized for heating or drying.

Referring to the drawings:

Figure 3 is a cross sectional view of Figure 1 along the line 3, 3, looking in the direction of the arrows.

Figure 3a is a cross sectional view of Figure 1 along the line 3a, 3a, looking in the direction of the arrows.

Figure 4 is a view in longitudinal section of a modified form of heater adapted to rest upon the floor.

Figure 5 is a sectional view along the line 5, 5, of Figure 4 looking in the direction of the arrows.

Figure 6 is a horizontal sectional view of Figure 5 along the line 6, 6, looking in the direction of the arrows.

Figure 1:
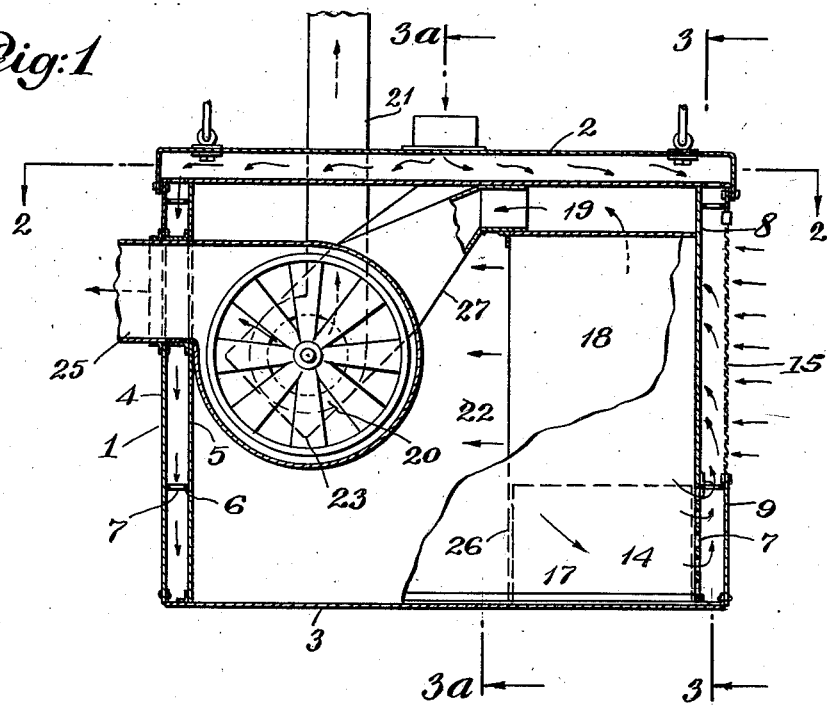
Figure 1 is a longitudinal sectional view of a device embodying the principles of my invention.
Figure 2:
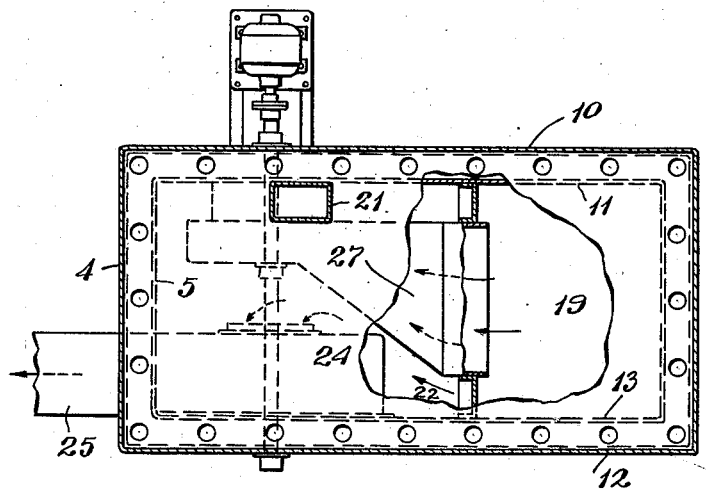
Figure 2 is a horizontal sectional view along the line 2, 2, of Figure 1 looking in the direction of the arrows.

In carrying out my invention, I propose to provide a casing 1 enclosing the unit heater. The walls of the casing 1 are made preferably of metal. The top 2 and bottom 3 of container 1 are of single or double thickness of metal. The sides have double walls 4 and 5 maintained in spaced relationship by channel or angle separators and braces 6 secured by welding or in any other well known manner between the walls 4, 5, 8, 9, 10, 11, 12 and 13. Channel or angle braces 6 have openings or passages 7 to permit of the intake of air at the top of the walls and the passage between the walls and the delivery of the air into combustion chamber or the air heating chamber. For this purpose, openings in the inner walls 11 and 13 are formed for the combustion air 14 and openings 15 for the heated air in the walls 4, 5, 8, 9. Channels or angles 16 are welded into the bottom between the walls and these channels or angles have no openings therein. This construction of the wall makes a rigid and strong wall with but very little weight and permits of rapid preheating and the elimination of the fire bricks in the combustion chamber 17. Any well known form of oil or gas burner may be used in the combustion chamber 17. I prefer the aspirating type of oil burner B where an oil burner is used. The preheated combustion air furnishes the means for complete combustion of the oil or gas. The heated products of combustion pass up through the heat interchanger 18. The interchanger may be of the type shown in Harrison Patent No. 1,621,881 and No. 1,506,121, wherein the products of combustion pass through the heat interchanger, through passages having walls separating the products of combustion from the incoming air to be heated which likewise passes through the heat interchanger but at right angles to the direction of flow of the products of combustion. The walls of the two sets of passages prevent commingling with the products of combustion with the air to be heated. Upon passage through the heat interchanger the products of combustion enter chamber 19 and are drawn by fan 20 to stack 21 where they pass out of the heater. The preheated air for drying or heating purposes which has entered through openings 15 into the heat interchanger 18, passes therethrough at right angles to the products of combustion into chamber 22 and thence it is drawn by fan 23 into chamber 24 and expelled through duct 25 for heating or drying purposes. Additional air for drying and heating purposes is admitted through the opening 15 in the casing. Opening 15 is preferably screened.

I propose to operate both fans 20 and 23 upon a single shaft driven by a single motor, the fans being of different predetermined sizes, the larger fan for the heated air.

The combustion chamber 17 is formed by a side wall 26 supporting a side of the heat interchanger 18, the heat interchanger 18 forming a top for the combustion chamber 17.

Partition 27 separates the products of combustion from the heated air delivered from the heat interchanger to the two fans 20, 23, which are enclosed in separate chambers. Some of the air to be heated passing through the heat interchanger emerges into the chamber 22, which latter functions as a plenum chamber and is required in order to utilize a smaller blower and motor than would be the case without such chamber. By reason of the compactness of the device, excessive cost of operation would be required without plenum chamber 22. In addition, the heated air in the plenum chamber continues to absorb heat from the hot partitions 27, 21, which separate the air being heated from the products of combustion in the combustion chamber and around the blower 20. This more than counterbalances for the heat transfer from plenum chamber 22 through the inner walls surrounding the plenum chamber 22. In the modified form shown in Figures 4 and 6, the combustion chamber 17 is also below the heat interchanger while the fans 20', 23', are above. The heat interchanger 18' is of the same type but is tilted in order to economize on space and also to permit of a general upward direction of both the products of combustion and the air being heated although the air being heated passes at right angles to the direction of flow of the products of combustion while in the interchanger 18', the products of combustion from chamber 17 pass through heat interchanger 18' into chamber 19' formed by partitions 27' surrounding fan 20'. The preheated air from chamber 30 passes through heat interchanger 18' into chamber 31 and thence into exhaust fan 23' from where it is exhausted into duct 25'. The construction of the walls and fans are identical in both the modified and preferred structures.

It will thus be seen that I have provided a unit heater of light weight wherein the combustion chamber is without fire bricks or the like and the walls are air cooled. It will be further seen that the heat hitherto wasted in absorption by the combustion chamber linings is utilized for preheating the combustion air and the air forming the heating medium to increase the efficiency of the unit. The unit is of such light construction and so compact that it is easily movable in a factory requiring only electrical connections and fuel oil or gas connections and may even be suspended from the ceiling beams or trusses thereby giving greater floor space as the heater requires practically no attention. Both the products of combustion and the air that is heated are each controlled in closed systems within the heater and wherein the suction or draft pressures are likewise controlled so that the respective velocities and quantity of heated air and products of combustion are maintained in predetermined known ratios.

What I claim is:

A unit heater comprising an outer casing having inner and outer walls in spaced relationship, means for maintaining the walls in spaced relationship, said spacing means at the top of the casing having openings to the atmosphere and to the space between the walls, a combustion chamber, an air chamber, said spaced walls surrounding said combustion chamber and said air chamber, said spaced walls having a communicating opening to said combustion chamber whereby the air entering through said openings in said spacing means at the top of the casing will absorb the heat from the walls in its passage therethrough into the combustion chamber, a heat interchanger, said combustion chamber communicating with said heat interchanger for interchanging the heat of the combustion gases and fresh air and air from the space between said walls, said heat interchanger communicating with said air chamber, a fresh air passage through said spaced walls to said heat interchanger, means for separately delivering the heated air and the products of combustion from the heater.

RYAN SADWITH.